Figure 1:
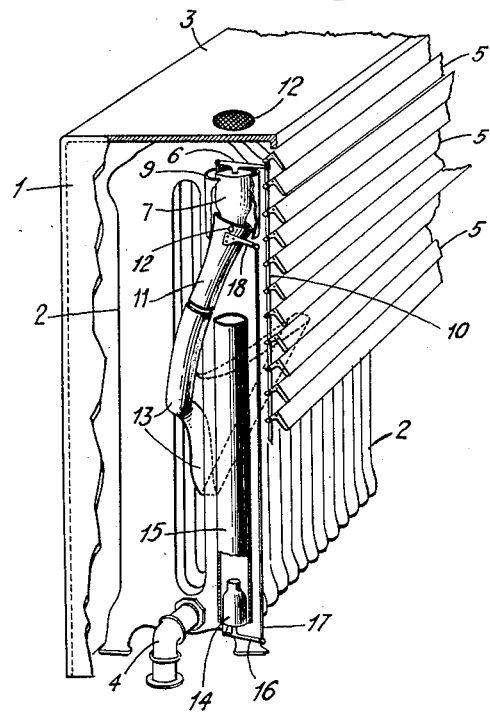

July 11, 1933.   S. G. FRANTZ ET AL   1,917,880

THERMOSTAT CONTROL

Filed March 11, 1932

INVENTORS
S.G. FRANTZ, B.S. McCUTCHEN
W. van B. ROBERTS
BY Frank S. Misterly
ATTORNEY Patented July 11, 1933

1,917,880

UNITED STATES PATENT OFFICE

SAMUEL G. FRANTZ, BRUNSON S. McCUTCHEN, AND WALTER VAN B. ROBERTS, OF PRINCETON, NEW JERSEY; SAID FRANTZ AND SAID ROBERTS ASSIGNORS TO SAID McCUTCHEN

THERMOSTAT CONTROL

Application filed March 11, 1932. Serial No. 598,168.

This invention relates to temperature control devices and particularly to means responsive to temperature changes adapted to maintain the temperature in any desired room substantially within predetermined limits.

One of the objects of this invention is to provide means through which a relatively large controlling force is obtained in response to a relatively small change of temperature.

Another object of the invention is to provide a novel means for cascading two or more heat-operated devices so as to produce an amplifying effect.

Another object of the invention is to provide an arrangement of two or more heat-operated devices of different sensitivity and having the one of greater sensitivity control the one of lesser sensitivity.

Other objects of the invention will appear from the following description taken together with the drawing which forms a part of this specification, and in which:—

Figure 2:
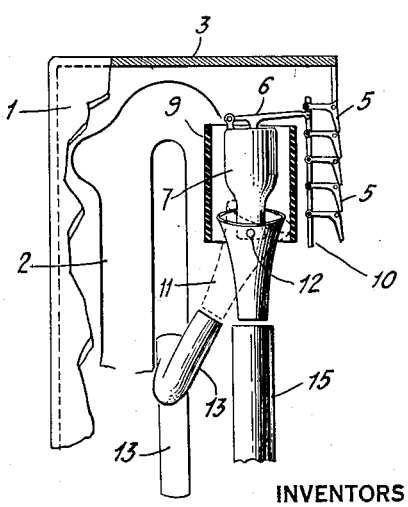

Figure 1 shows a general view, partly broken away, of the invention as applied to control the temperature of a room heated by a radiator; and, Figure 2 is an enlarged sectional view of certain elements shown in Fig. 1.

The present invention is particularly useful in cases wherein it is desirable to maintain a substantially constant flow of heating vapor from a source to a radiator and wherein the control of heat transfer from the radiator to the room is to be accomplished by means of a thermostat operated shutter arrangement which controls the intensity of flow of convection currents around and through the radiating surfaces of the radiator. In such cases elaborate systems involving electric motors and complicated electrical circuits have heretofore been found necessary due to the fact that thermostats capable of producing of themselves a great enough force to operate the shutters for small changes in temperature cannot be produced. This results from the fact that thermo-elements whether they be bi-metallic, fluid expansion, or of any other type, are essentially heat engines, and cannot possibly work with a greater efficiency than an ideal heat engine working on a "Carnot cycle".

This means that for a given amount of working substance the power output per cycle changes rapidly with temperature difference upon which it operates.

In the present invention, the above factor is overcome by the incorporation of a novel cascading effect whereby a high-power thermo-element is enabled to work on a temperature difference of many times the permitted room temperature variation. It is thus enabled to deliver per cycle many times as much power as would be delivered by the same element operating directly on room temperature. Stating it another way, for the same power output the size and cost of the necessary thermo-elements are greatly reduced.

Referring to the form of the invention shown in the drawing, 2 represents a radiator having the customary feed pipe 4 through which the hot vapor is fed into the radiator. Radiator 2 is provided with an enclosure 1 which may be constructed of any suitable material. The radiator enclosure 1 comprises a top portion 3 having a small screened opening 12 and a side portion having movably mounted thereon movable shutters 5. These shutters are arranged so that they all may be operated simultaneously and for accomplishing the operation thereof there is provided a connecting rod 10 which is actuated by a pivoted lever 6 attached to the movable end of a comparatively large thermostat 7. An insulating shielding sleeve arrangement 9 is disposed adjacent the thermostat 7 so as to insulate it from the hot sections of the radiator. A movable deflector 11 pivoted at 12 to the thermostat housing is adapted to form a downward continuation of the insulation sleeve 9. An inverted funnel-shaped flue 13 is suitably disposed so as to receive and guide hot air from the hot surfaces of the radiator 2. A second flue 15 preferably made of suitable partial insulating material is disposed so as to receive and guide room air from below the radiator. The two flues 13 and 15 are so disposed relative to the pivoted deflector 11 that when the deflector is rotated clockwise about pivot 12 (Fig. 1) the hot air rising in flue 13 is deflected through 11 and made to pass through sleeve 9 and thereby forced to pass around thermostat 7, whereas when deflector 11 is rotated counterclockwise the room temperature air rising in flue 15 is deflected through 11 and forced to pass around thermostat 7.

In this way thermostat 7 may be subjected to large temperature differences since the room air passing up flue 15 is considerably cooler than air off the hot radiator surfaces passing up flue 13. A sensitive pilot thermostat 14 which may be considerably smaller than thermostat 7 is supported in any suitable manner within the lower portion of flue 15. Thermostat 14 is, therefore, responsive to the temperature of the air drawn from the room by the normal convection current of the radiator. As illustrated, thermostat 14 is arranged so that its lower end is the movable portion which end is attached through a lever 16 to one end of rod 17. The other end of rod 17 is attached to an arm 18 which is fixed to the movable deflector 11.

It is seen that in the arrangement described movements of lever 16 due to small changes in room temperature swing deflector 11 so as to apply large temperature changes to thermostat 7.

The operation of the system disclosed is as follows:

In the positions of the parts shown in Fig. 1, the room is at or above the temperature desired, therefore, the thermo-element 14 is expanded and the shutters 5 are in the act of being closed in Fig. 1 thereby reducing the transfer of heat to the room to a minimum. If now the room temperature drops a few degrees below the desired temperature, thermostat 14 collapses thereby pushing up rod 17 and swinging deflector 11 counterclockwise to the position shown in Fig. 2. This allows a current of cool air to pass over thermo-element 7 which collapses causing lever 6 to operate and open shutters 5 which are shown prior to being opened in Fig. 2 thus increasing the intensity of heat transfer to the room. Then when the temperature of the room is again up to the desired point, 14 expands pulling down rod 17 and rotating deflector 11 to the position shown in Fig. 1 so as to guide hot air from flue 13 and pass it over 7, thereby quickly raising the temperature of 7 by a large amount, say 20 or 30 degrees. This makes available a large amount of power which working through lever 6 and connecting rod 10 closes shutters 5. In this way, a very small temperature change in the room is able to control a relatively large amount of power for operating the shutters without the use of an inconvenient large amount of working substance in any thermo-element.

From the operation of the system it will be seen that the flue 15 should be partially heat conducting in order to heat the air therein to a slight degree and thereby cause air from the room to rise in the flue. It will also be seen that the screened opening 12 at the top of the enclosure 1 while not absolutely necessary is of some use to permit a direct passage for the controlling air especially when the shutters 5 happen to be closed. It is to be understood that the opening 12 is comparatively small and that therefore its effect upon the temperature of the room is negligible.

It will be understood that various forms of the invention other than that described above may be used without departing from the spirit or scope of the invention as claimed below.

We claim:

1. In a room temperature controlling system in combination a radiator having a housing provided with a movable shutter for controlling the air convection currents passing over the heating surface of said radiator and thereby the temperature in the room, a main thermo-element mounted within said housing for operating said shutter, a pilot thermo-element also mounted within said housing and responsive to the air temperature entering the housing and a deflector device controlled by said pilot thermo-element for controlling the temperature around said main thermo-element.

2. The combination with a radiator having a housing in which there is disposed at least one thermostat controlled movable shutter, a flue for receiving hot air from the hot surfaces of the radiator, a second flue for receiving air at room temperature, a deflector device adapted to deflect air from either of said two flues to said thermostat and means controlled by temperature changes of the room air for controlling the operation of said deflector device.

3. In a system for controlling the temperature of a circulating medium, a heat source, an enclosure for the source and adapted to allow a flow of the medium therethrough and around the source whereby heat is transferred from the source to the medium and the medium heated thereby, said enclosure including a movable shutter for determining the rate of flow of the medium therethrough, a thermostat for operating the shutter, said thermostat being shielded from the source, a flue for receiving and confining the flow of a portion of the medium entering the enclosure, a movable deflector device adapted in one position to receive heated medium flowing through said enclosure and direct it toward the thermostat whereby the thermostat is exposed to the temperature of the heated medium and in another position to receive the medium flowing in said flue and direct it toward the thermostat whereby the thermostat is exposed to the temperature of the medium in the flue, and means controlled by temperature changes in the medium external to the enclosure for determining the operation of the deflector device.

4. In a system for controlling the temperature of a room wherein the room air is allowed to pass over heat transfer means, an enclosure for said means adapted to allow the air to flow therethrough and over the heat transfer means, said enclosure being arranged so as to provide at least two paths of confined flow for the air therethrough one of the paths leading a portion of the air entering the enclosure over the heat transfer means whereby heat is given up by one and absorbed by the other, the other of said paths leading another portion of the air entering the enclosure therethrough but substantially insulating it from the heat transfer means, whereby the last named portion of the air is prevented from being affected by coming in contact with the heat transfer means to any substantial degree, controllable means for determining the rate of flow of the air through the first path, a primary thermostat having connection with the controllable means to operate the same, a secondary thermostat responsive to temperature changes of the air entering the second named path and means controlled by the secondary thermostat for exposing the primary thermostat to the air flowing in either of said paths in accordance with the variations in temperature of the medium entering the second named path.

5. In a system for controlling the temperature of a circulating medium, a heat source, an enclosure for the source and adapted to allow a flow of the medium therethrough and over the source whereby heat is transferred from the source to the medium, said enclosure including a thermostat controlled movable shutter adapted to control the rate of flow of the medium through the enclosure, a flue within the enclosure adapted to receive and direct heated medium from the heating surfaces of the source, a second flue for receiving and directing a portion of the medium entering the enclosure, a deflector adapted to receive and subject the thermostat to the medium from either of the two flues and means controlled by temperature changes of the medium entering the second named flue for determining the operation of the deflector.

6. The system described in claim 5 wherein the last named means comprises a second thermostat mounted within the second named flue.

7. In a system for controlling the temperature of a circulating medium, a heat source, an enclosure for the source and adapted to allow a flow of the medium therethrough and over the source whereby heat is transferred from the source to the medium, said enclosure including a thermostat controlled movable shutter device adapted to control the rate of flow of the medium through the enclosure, a flue within the enclosure adapted to receive and direct heated medium from the heating surfaces of the source, a second flue for receiving and directing a portion of the medium entering the enclosure, a deflector adapted to receive the medium flowing through either of the two flues and expose the thermostat thereto, means controlled by temperature changes of the medium entering the second named flue for determining the operation of the deflector, and an opening provided in the enclosure and arranged with respect to the second named flue so as to allow the medium to flow at least through said second named flue irrespective of the condition of the shutter device.

8. The system described in claim 7 wherein the first named thermostat is normally sensitive only to wide temperature changes and the second named thermostat as compared with the first is normally sensitive to temperature changes which are relatively small.

9. In a system for controlling the temperature of a circulating medium, a heat source, an enclosure for the source, said enclosure being arranged so as to provide two paths of confined flow for the medium therethrough one of said paths leading a portion of the medium entering the enclosure over the source whereby heat is transferred from the source to the medium, the other of said paths leading another portion of the medium entering the enclosure therethrough but substantially insulating it from the source whereby the last named portion of the medium is heated only to a fraction of the temperature to which the first named portion of the medium is heated, controllable means for determining the rate of flow of the medium through the first path, a primary thermostat having connection with the controllable means to operate the same, a secondary thermostat responsive to temperature changes of the medium entering the second named path, and means controlled by the secondary thermostat for exposing the primary thermostat to the medium flowing in either of said paths in accordance with the variations in temperature of the medium entering the second named path.

10. The system described in claim 9 wherein the primary thermostat is normally sensitive only to wide temperature changes and the secondary thermostat as compared with the primary thermostat is normally sensitive to temperature changes which are relatively small.

11. In a system for controlling the temperature of a circulating medium, a heat source, an enclosure for the source and adapted to allow a confined flow of the medium therethrough and over the source whereby heat is transferred from the source to the medium, controllable means for determining the rate of flow of the medium through the enclosure, a primary thermostat mounted within the enclosure and responsive to changes in temperature of the medium entering the enclosure, a secondary thermostat having connection with the controllable means to operate the same and normally exposed to a circulating current of the medium heated by passage thereof over the source and means operated by the primary thermostat for exposing the secondary thermostat to a different circulating current of the medium.

12. In a system for controlling the temperature of a medium, a heat source, an enclosure surrounding the heat source and adapted to allow a confined flow of the medium therethrough and over the source whereby heat is transferred from the source to the medium, controllable means for determining the rate of flow of the medium through the enclosure, a primary thermostat mounted within the enclosure and responsive to changes in temperature of the medium entering the enclosure, a secondary thermostat having connections with the controllable means to operate the same and normally exposed to a current of the medium heated by passing over said source, and means operated by the primary thermostat for controlling the temperature of the medium flowing around the secondary thermostat.

SAMUEL G. FRANTZ.
BRUNSON S. McCUTCHEN.
WALTER van B. ROBERTS.